(No Model.)

E. F. PFLUEGER.
CUFF BUTTON.

No. 290,604. Patented Dec. 18, 1883.

Witnesses:
J. Henry Kaiser.
F. L. Brown

Inventor.
Ernest F. Pflueger
By Geo. W. McIntire
atty

United States Patent Office.

ERNEST F. PFLUEGER, OF AKRON, OHIO.

CUFF-BUTTON.

SPECIFICATION forming part of Letters Patent No. 290,604, dated December 18, 1883.

Application filed June 21, 1883. (No model.)

*To all whom it may concern:*

Be it known that I, ERNEST F. PFLUEGER, a citizen of the United States, residing at Akron, Summit county, Ohio, have invented new and useful Improvements in Cuff-Buttons, of which the following is a specification.

My invention relates to certain new and useful improvements in cuff-buttons.

It has for its object to provide a novel and pleasing ornamentation; and it consists of a cuff-button composed of glass or other suitable material, having the visible portion ornamented in any suitable manner with a substance which shall be luminous in the dark, as will be hereinafter more fully set forth.

In order that those skilled in the art may fully understand my invention, I will proceed to describe the same with particularity, referring by letters to the accompanying drawings, in which—

Figure 1:
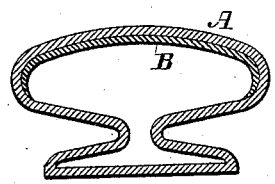
Figure 2:
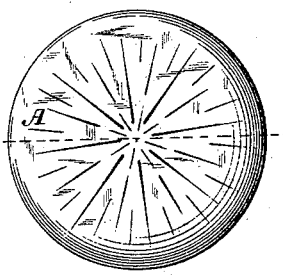
Figure 3:
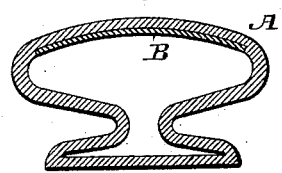
Figure 4:
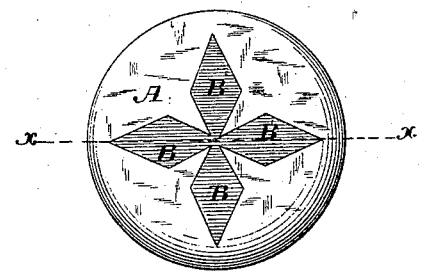
Figure 5:
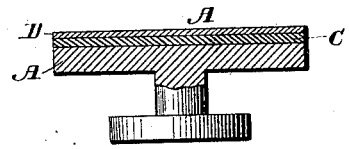

Figure 1 is a sectional view of a button embodying my invention. Fig. 2 is a top or plan view of the same. Fig. 3 is a sectional view taken at the line $x\ x$ of Fig. 4. Fig. 4 is a plan view, showing a special ornamentation; and Fig. 5 is a sectional view of a modified manner of producing the results aimed at.

Similar letters indicate like parts in the several figures of the drawings.

I propose making a cuff-button, A, preferably of malleable glass, and if hollow, as shown at Figs. 1, 2, 3, and 4, I coat the interior surface of that portion of the button which is exposed to view with a film of luminous compound, which may be self-luminous—as phosphoric compounds—or luminous by an inherent retentive power, whereby, after having been exposed to light, it remains luminous for a considerable time afterward. This film or coating is shown in Figs. 1 and 3 at B, and the light produced is illustrated by the radiating lines and shaded figures at Figs. 2 and 4. The compound may be spread evenly over the interior surface, as shown at Fig. 1; or the surface may be etched or molded with depressions to form any design, and such depressed portions filled or coated with the compound, in which case the design will appear illuminated, as seen at Figs. 3 and 4, while the surface surrounding such predetermined design will be in its natural condition. As stated, I prefer to apply my invention to buttons formed of glass and made hollow, in order that the luminous compound may be so located as to be protected from abrasion and wear; but I may, without departing from the spirit of my invention, make the button of any other suitable material, and coat the exposed surface exteriorly, as shown at C, Fig. 4; and in order to protect the same I cover the said coating with any suitable transparent or translucent covering, as seen at D.

It will of course be understood that my invention may be readily applied to buttons other than cuff-buttons. For instance, ladies' dress-buttons of any particular or desired configuration may be made and coated with the luminous compound, and a very pretty effect produced.

What I claim as new, and desire to secure by Letters Patent, is—

A cuff or other button formed of a body of transparent material, having beneath the surface thereof a coating or layer of luminous material, as and for the purpose set forth.

In testimony whereof I have hereunto set my hand in the presence of two subscribing witnesses.

ERNEST F. PFLUEGER.

Witnesses:
FRANK M. ATTERHOLT,
ADAM YERRICK.